(12) United States Patent
Fusco et al.

(10) Patent No.: US 11,663,228 B2
(45) Date of Patent: May 30, 2023

(54) AUTOMATED MANAGEMENT OF DATA TRANSFORMATION FLOWS BASED ON SEMANTICS

(71) Applicant: INTERNATIONAL BUSINESS MACHINES CORPORATION, Armonk, NY (US)

(72) Inventors: Francesco Fusco, Maynooth (IE); Robert Gormally, Galway (IE); Mark Purcell, Naas (IE); Seshu Tirupathi, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/743,847

(22) Filed: Jan. 15, 2020

(65) Prior Publication Data

US 2021/0216545 A1 Jul. 15, 2021

(51) Int. Cl.
*G06F 16/00* (2019.01)
*G06F 16/2458* (2019.01)
*G06F 9/30* (2018.01)
*G06F 16/28* (2019.01)
*G06F 16/2457* (2019.01)

(52) U.S. Cl.
CPC ........ *G06F 16/2474* (2019.01); *G06F 9/3005* (2013.01); *G06F 16/24575* (2019.01); *G06F 16/284* (2019.01)

(58) Field of Classification Search
CPC .............. G06F 16/2474; G06F 16/284; G06F 16/24575; G06F 9/3005

USPC ................................................... 707/600–899
See application file for complete search history.

(56) References Cited

U.S. PATENT DOCUMENTS

| | | | |
|---|---|---|---|
| 8,024,369 B2 | 9/2011 | Pellegrini et al. | |
| 9,256,969 B2 | 2/2016 | Krajec et al. | |
| 9,607,060 B2 | 3/2017 | Li et al. | |
| 10,313,177 B2 | 6/2019 | Radivojevic et al. | |
| 11,263,382 B1* | 3/2022 | Sharzer | G16H 10/60 |
| 2007/0174308 A1* | 7/2007 | Rausch | G06F 16/283 |
| 2016/0210296 A1* | 7/2016 | Sweeney | G06F 3/04842 |
| 2017/0046416 A1 | 2/2017 | Haas et al. | |
| 2019/0042956 A1 | 2/2019 | Huang et al. | |
| 2019/0114289 A1 | 4/2019 | Dang et al. | |
| 2019/0130007 A1 | 5/2019 | Hao et al. | |
| 2019/0146849 A1 | 5/2019 | Leonard et al. | |

OTHER PUBLICATIONS

"Castor: Contextual IoT Time Series Data and Model Management at Scale," Chen et al. Feb. 8, 2019 (6 Pages).

* cited by examiner

*Primary Examiner* — Irete F Ehichioya
*Assistant Examiner* — Shirley D Hicks
(74) *Attorney, Agent, or Firm* — Griffiths & Seaton PLLC (57) ABSTRACT

Various embodiments are provided for intelligent management of data flows in a computing environment by a processor. One or more data transformation in time-series data applications templates may be created and managed according to concepts, one or more instances of the concepts, relationships between the concepts, and a mapping of the concepts to one or more data sources.

18 Claims, 8 Drawing Sheets

AUTOMATED MANAGEMENT OF DATA TRANSFORMATION FLOWS BASED ON SEMANTICS

BACKGROUND OF THE INVENTION

Field of the Invention

The present invention relates in general to computing systems, and more particularly to, various embodiments for providing automated management of data transformation flows based on semantics using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entity's survival and adaptability in a highly competitive environment. Also, many businesses and organizations, such as financial institutions, employing the use of computing systems and online data must ensure operations, practices, and/or procedures are in compliance with general business protocols, corporate compliance, and/or legal regulations, policies, or requirements.

SUMMARY OF THE INVENTION

Various embodiments for providing automated management of data transformation flows based on semantics in a computing environment by a processor are provided. In one embodiment, by way of example only, a method for providing intelligent management of data flows, again by a processor, is provided. One or more data transformation in time-series data applications templates may be created and managed according to concepts, one or more instances of the concepts, relationships between the concepts, and a mapping of the concepts to one or more data sources.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As a preliminary matter, computing systems may include large scale computing called "cloud computing," in which resources may interact and/or be accessed via a communication system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

As the amount of electronic information continues to increase, the demand for sophisticated information access systems also grows. Digital or "online" data has become increasingly accessible through real-time, global computer networks. The data may reflect many aspects of topics ranging from scientific, legal, educational, financial, travel, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, many IoT applications handle numerous time series and complex data sets. Knowledge extraction (through analytical models for prediction, optimization) requires the definition, deployment and management of data transformation flows performing various tasks such as time alignment, aggregation, interpolation, outlier detection, etc. Data transformation tasks are time-consuming, tedious, difficult to monitor and maintain in large and dynamic IoT applications, which continuously change and can grow over time. Accordingly, a need exists for providing automated management of data transformation flows based on semantic.

In one aspect, various embodiment of the present invention provide for intelligent management of data flows. One or more data transformation in time-series data applications templates may be created and managed according to concepts, one or more instances of the concepts, relationships between the concepts, and a mapping of the concepts to one or more data sources.

In an additional aspect, time-series data may be mapped to a semantic database. The mapping allows for expressing user-defined data transformations as "templates" (e.g., data transformation templates) applicable to each and every instances of similar semantic concepts. Data transformation flows may be automatically replicated to specific instances of time-series data with relevant semantic concepts.

It should be noted that a data transformation template may be generic implementation of a data transformation logic (e.g. a piece of application/software code) parameterized with respect to certain input (e.g. code variable unknown until execution). A data transformation flow is an actual specification of the data transformation where the input parameters are specified (e.g. it may physically be a configuration that specifies both a data transformation template and the value for its input parameters, such that a system can execute the transformation code), Thus, many data transformation flows can exist for the same template but with different input parameters. Additionally, one or more changes in the application data sources or semantics may be monitored, tracked, and/or detected and appropriately reflect in existing data transformation flows. That is, existing data transformation flows may automatically adapt to changes in the application data such as, for example, an aggregation data transformation flow that sums up all children of a semantic entity may be automatically updated when a new data source appears among the children of the aggregation.

In an additional aspect, the present invention provides for automatically creating and managing data transformation templates/flows in time-series data driven applications, wherein the created data transformation templates include domain based concepts, relation between concepts, and mapping of concepts to data sources. In one aspect, a semantic description of the application domain may be represented based on concepts, instances of the concepts, relationships between concepts, mapping of the semantic concepts to available data sources. That is, "represented" may refer to how semantics of the application domain can be represented (e.g., represented in a system) such as, for example, using concepts and relationships between concepts (e.g., semantic triplets), which is the way knowledge bases are expressed. A data transformation code templates and meta information specifying semantic concepts of inputs and outputs of the data transformation may be received. One or more specific instances of the data transformations applied to the data sources that match specific instances of the semantic concepts describing the input to the data transformation template may be created.

In an additional aspect, one or more new data sources may be created representing the output of instantiated (e.g., created) data transformations. That is, "instantiated data transformation" here mean data transformation flows, which could be considered as an instantiation of a data transformation template. One or more new data sources may be mapped to the semantic concepts describing the output of the data transformation. Also, the present invention may continuously monitor changes in one or more available data sources and related semantic concepts (if new data transformations can be created or if existing data transformations are no longer valid).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
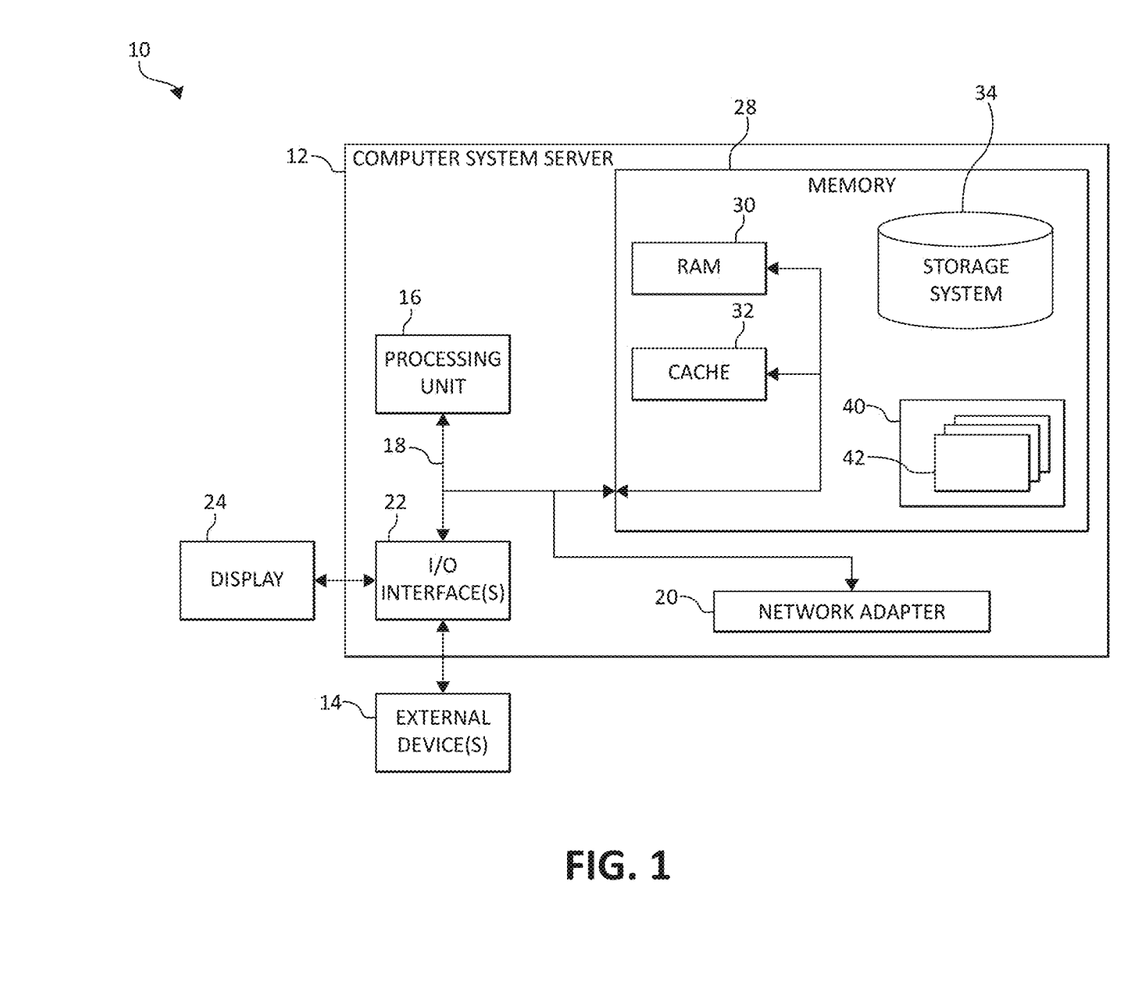
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
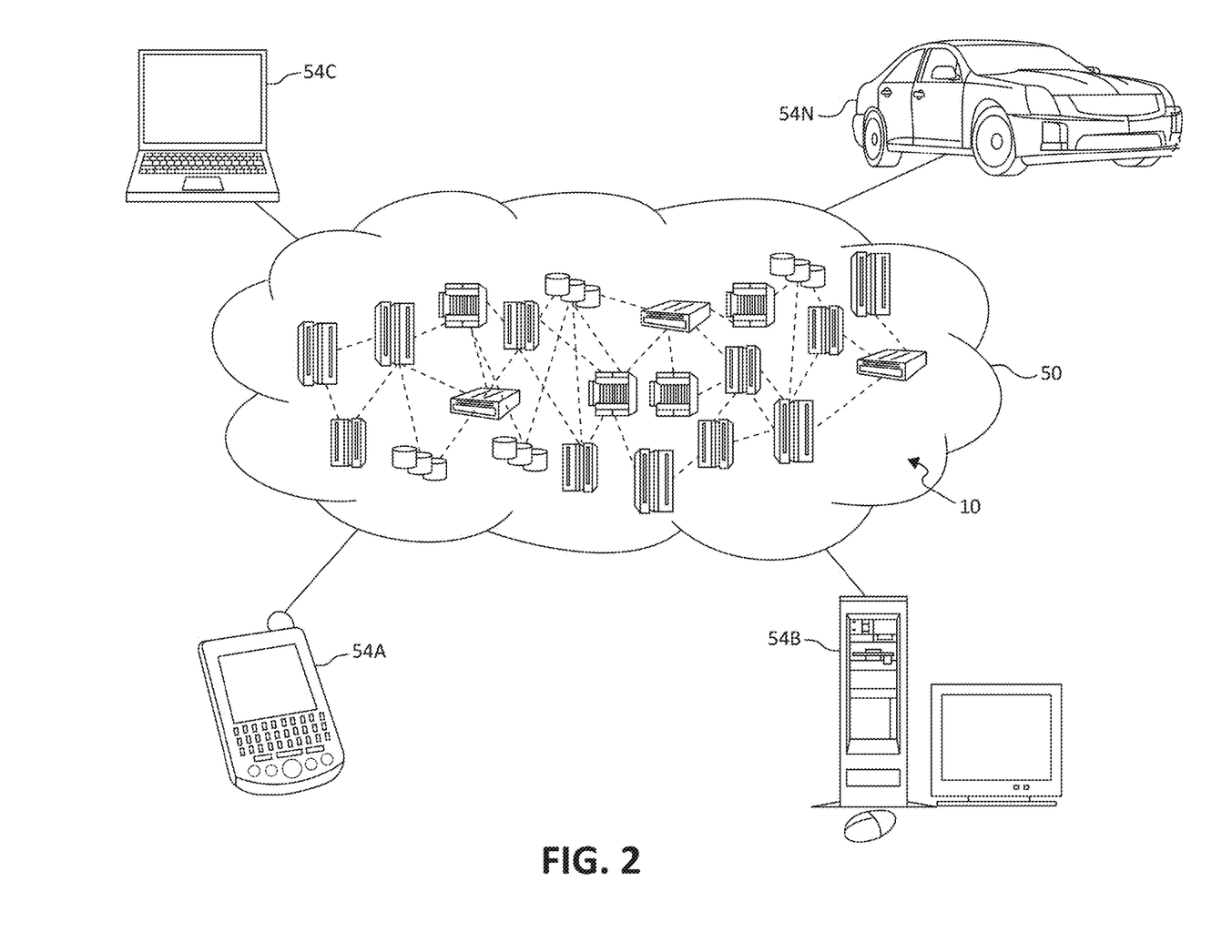
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
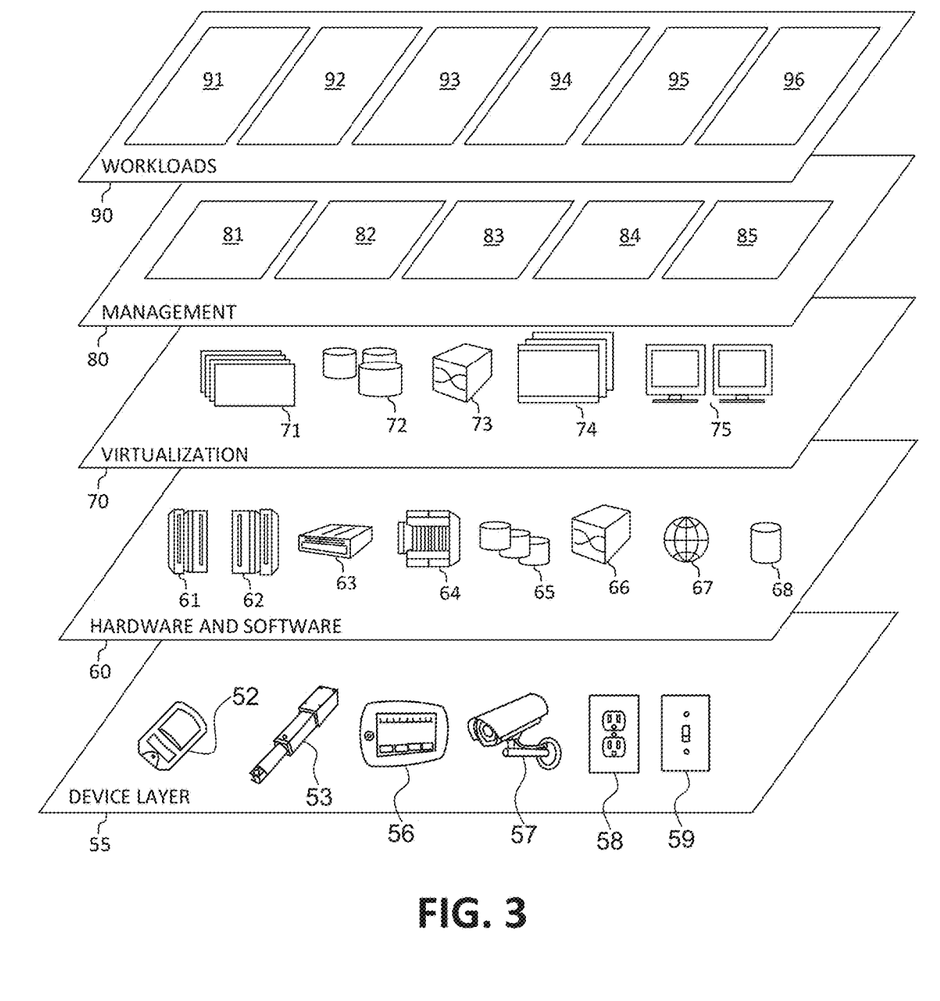
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automated management of data transformation flows. In addition, workloads and functions 96 for automated management of data transformation flows may include such operations as analytics, entity and obligation analysis, and as will be further described, user and device management functions. One of ordinary skill in the art will appreciate that the workloads and functions 96 for automated management of data transformation flows may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides a system that may providing intelligent management of data flows, again by a processor, is provided. One or more data transformation in time-series data applications templates may be created and managed according to concepts, one or more instances of the concepts, relationships between the concepts, and a mapping of the concepts to one or more data sources. In one aspect, a semantic may be one or more concepts and relationships between the one or more concepts.

For example, consider an IoT Application for the monitoring of energy time-series in a smart grid. A semantic description of all relevant smart grid concepts (electrical grid assets, power equipment, consumers, generators, power, energy, etc.) may be learned, identified, and/or received for a data flow template. The present invention may learn or provided a mapping between available IoT data sources (time-series identifiers) and concepts.

The present invention may receive new data analytic flows and preferences for automatic deployment. The present invention may provide a data transformation template/code for certain semantic concepts such as, for example, transformation of irregular power time-series to hourly energy data, transformation of individual equipment power load to an aggregated grid location power load, and/or a transformation of energy demand at location X and at all neighbors to energy demand at location X corrected from outliers.

The present invention may automatically create new data transformation flows. For example, new data transformation flows may occur 1) when new, irregularly sampled power time-series is received, the system creates a new instance of the data transformation flow for calculating hourly energy from power, and/or 2) when new, irregularly sampled power time-series is received for some residential consumers. The present invention may create an aggregation data transformation flow to compute total power at a grid transformer where the consumers are connected.

Existing data transformation flows may identify, learn, and/or identify (e.g., to stay up to date) changes in any data sources. When a new data source representing a new power equipment connected to a given grid point is available, existing power aggregation data transformation for that grid point will automatically take into account the new data source in the next aggregation updates. Creation of data transformation flows may create new data sources (the result of the data transformation), which might make the application of additional data transformation flows possible. The data transformation result of the aggregated power demand at grid location enables application of a data transformation from power into hourly energy. The data transformation result of hourly energy at a grid location then enables application of a data transformation to correct outliers of energy demand time-series.

Figure 4:
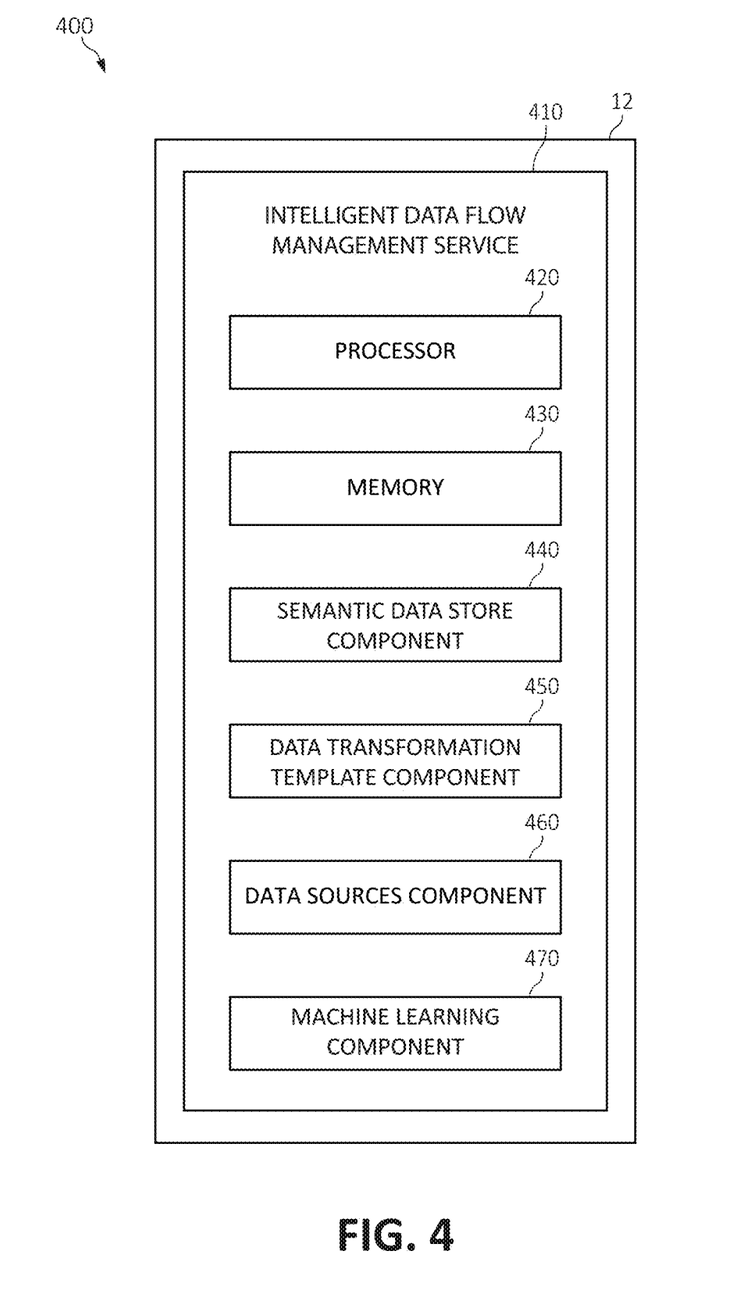
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An intelligent data flow management service 410 is shown, incorporating processing unit ("processor") 420 to perform various computational, data processing and other functionality in accordance with various aspects of the present invention. The intelligent data flow management service 410 may be provided by the computer system/server 12 of FIG. 1. The processing unit 420 may be in communication with memory 430. The intelligent data flow management service 410 may include a semantic data store component 440, a data transformation template component 450, a data sources component 460, and a machine learning component 470.

As one of ordinary skill in the art will appreciate, the depiction of the various functional units in intelligent data flow management service 410 is for purposes of illustration, as the functional units may be located within the intelligent data flow management service 410 or elsewhere within and/or between distributed computing components.

The semantic data store component 440 may manage a semantic data store. In one aspect, the semantic data store component 440 may itself be a semantic data store (e.g., a database) and/or may access, manage, and/or control a semantic data store that is external to the intelligent data flow management service 410.

The semantic data store component 440 may receive and/or store a semantic context, which may be as a set of concepts, instances of the concepts, relationships. The semantic data store component 440 may receive and/or store mappings between instances of semantic concepts and data sources (e.g., time-series identification "ID").

The semantic data store component 440 may respond to (e.g., answer) one or more semantic-based queries by navigating the context to retrieve relevant data sources (e.g., navigating the semantic store as in searching the semantic space to find data sources that match the query). The data transformation template component 450 may manage data transformation templates with semantics. The data transformation template component 450 may receive and/or store user-provided data transformation code templates along with semantic information. The data transformation template component 450 may specify concepts of inputs/outputs to which the data transformation applies. The data transformation template (e.g., a data transformation code template) may leverage semantic queries to retrieve input data sources based on semantic concepts. The data transformation template component 450 may automatically create and/or update data transformation flows. The data sources component 460 may identify all new data sources suitable for application to available data transformation templates based on semantics and creating new instances of data transformation flow.

The data transformation template component 450, the data sources component 460, and/or the semantic data store component 440, may observe changes to semantic data store (e.g., updated semantics, deleted data sources, new data sources) and identify all required changes to the created data transformation flow (e.g., drop data transformation where not suitable anymore, change to a different data transformation, create a new data transformation now possible because of new data available).

The data transformation template component 450, the data sources component 460, and/or the semantic data store component 440, may receive user-defined preferences guiding the automatic creation and/or update of data transformation flows.

The semantic data store component 440 may be used for handling concepts/relationships and application data (time-series, images, etc.). The semantic data store component 440 may employ a semantic application programming interface ("API")/execution engine for retrieving/storing/updating semantic data store. That is, the semantic data store component 440 being both an API and an execution engine. The semantic data store component 440, using the execution engine for data transformation flows. The data transformation template component 450, the data sources component 460, and/or the semantic data store component 440 may use data from one or more external data sources (e.g., from IoT sensors) and use a data transformation code. The data transformation template component 450, the data sources component 460, and/or the semantic data store component 440 may learn and use a semantic description of the application domain and a mapping between one or more data sources, data models, and/or semantic concepts.

The machine learning component 470 may learn, determine, or identify semantic concepts, instances of the concepts, the relationships between the concepts, and the mapping of the concepts to one or more data sources, data flows, and/or data transformation templates relating to automated management of data transformation flows.

By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naïve Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
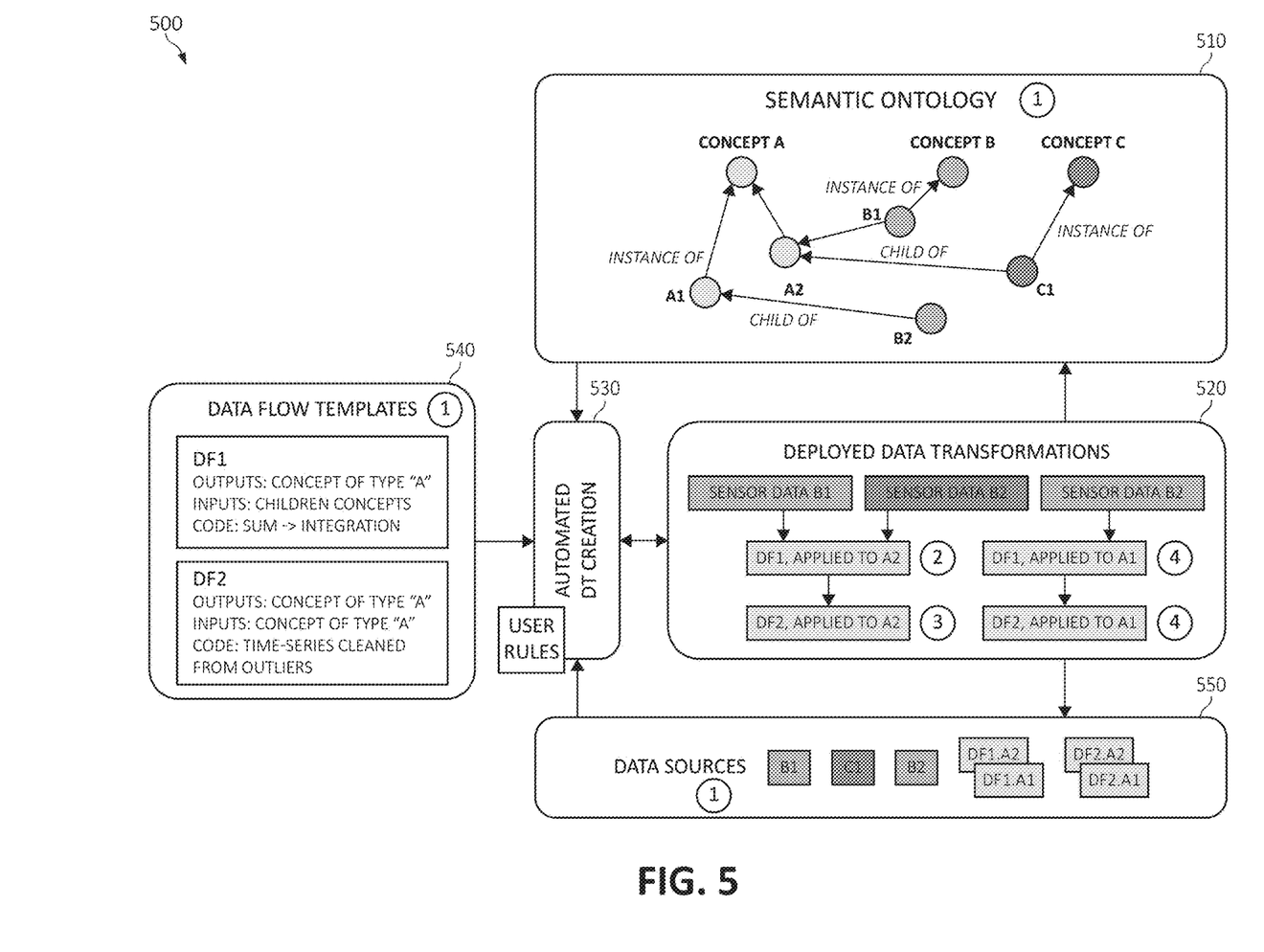
FIG. 5 is a flow diagram for providing automated management of data transformation flows based on semantics in accordance with aspects of the present invention.

Turning now to FIG. 5, block/flow diagram 500 is depicting for providing automated management of data transformation flows based on semantics. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality described in FIG. 5. Repetitive description of like elements, components, modules, services, applications, and/or functions employed in other embodiments described herein is omitted for sake of brevity.

Also, as shown, the various blocks of functionality are depicted with arrows designating the blocks' 500 relationships with each other and to show process flow. As will be seen, many of the functional blocks may also be considered "modules" or "components" of functionality. With the foregoing in mind, the module blocks 500 may also be incorporated into various hardware and software components of a system for providing automated management of data transformation flows based on semantics in accordance with the present invention. Many of the functional blocks 500 may execute as background processes on various components, either in distributed computing components, or on the user device, or elsewhere.

In one aspect, the block/flow diagram 500 depicts a semantic ontology 510, data flow templates 540, deployed data transformations 520, and one or more data sources 550.

The semantic ontology 510 (e.g., a semantic data store) may be a graph of nodes (e.g., concepts) and the relationships between the nodes (e.g., the concepts). The semantic ontology 510 represent a semantic description of an application domain based on concepts, instances of the concepts, relationships between concepts, mapping of the semantic concepts to available data sources 550. For example, concept B2 is a child of concept A1, which may be an instance of A. Concept B1 is an instance of concept B and a child of concept A2. Concept Cl may be an instance of C and a child of concept A2 (which may be a parent of B1). The deployed data transformations 520 may include sensor data (e.g., sensor data B1 and B2) from one or more data sources (e.g., data source B1, Cl, B2, etc.).

The data flow templates 540 may be a library and may include one or more data templates (e.g., predefined code that defines data template structure) such as, for example, data flow template DF1 and/or data flow template DF2. In one aspect, by way of example only, data flow template DF1 receives as input one or more "child" concepts of a parent concept. The data flow template code template is the time-integration of the sum of all data flows from its children. The data flow template DF2 receives as input one or more concepts of type "A" and outputs a concept of type "A." The data flow template code produces time-series data cleaned from outliers.

In one aspect, one or more data transformation ("DT") templates may be automatically created and managed (which may be according to one or more user rules) using the semantic ontology 510, data flow templates 540, data transformations 520, and/or one or more data sources 550.

In one aspect, at step 1, an ontology 510 (e.g., a semantic ontology) may be learned and/or provided via a user, a mapping to the one or more data sources 550 (e.g., a mapping between the data sources 550 and concepts). In step 2, an instance of a data flow of the data flow templates 540 may be deployed such as, for example, DF1 (e.g., data flow 1) of concept A1 and outputs a new data source such as, for example, data source DF1.A2.

In step 3, another instance of a data flow of the data flow templates 540 may be deployed such as, for example, DF2 (e.g., data flow 2) of concept A2 and outputs a new data source such as, for example, data source DF2.A2.

In step 4, a new data source B2 may be detected, identified, and/or received from the data sources 550 and may deploy one or more instances of data flow such as, for example, DF1 (e.g., data flow 1) for concept A1 and DF2 (e.g., data flow 2) for concept A2. For example, the "user rules" and the automated DT creation may occur, for example, when the user specifies rules for each data flow template (e.g., a "cascade" rule) and the automated DT creation takes such rules into account (e.g., it only propagates to step 3 if the "cascade" rule is present).

Thus, in summary, specific data transformation pipelines (e.g., deployed data transformations 520) may be automatically created such as, for example, by accessing and using one of the data flow templates 540 and find/identify a data source from the data sources 550 compatible with the semantic concepts of the data flow templates 540 and deploy the deployed data transformations 520. The deployed data transformations 520 may create a new time series data, which is the output of the deployed data transformations 520 and the output has a concept that is defined in one of the data flow templates 540. Thus, FIG. 5 depicts operations where a new data transformation may be applied since a new data template takes and uses the output of one of the deployed data transformations 520 as the input. Such operations may continue and enable building a graph of data transformations.

Figure 6:
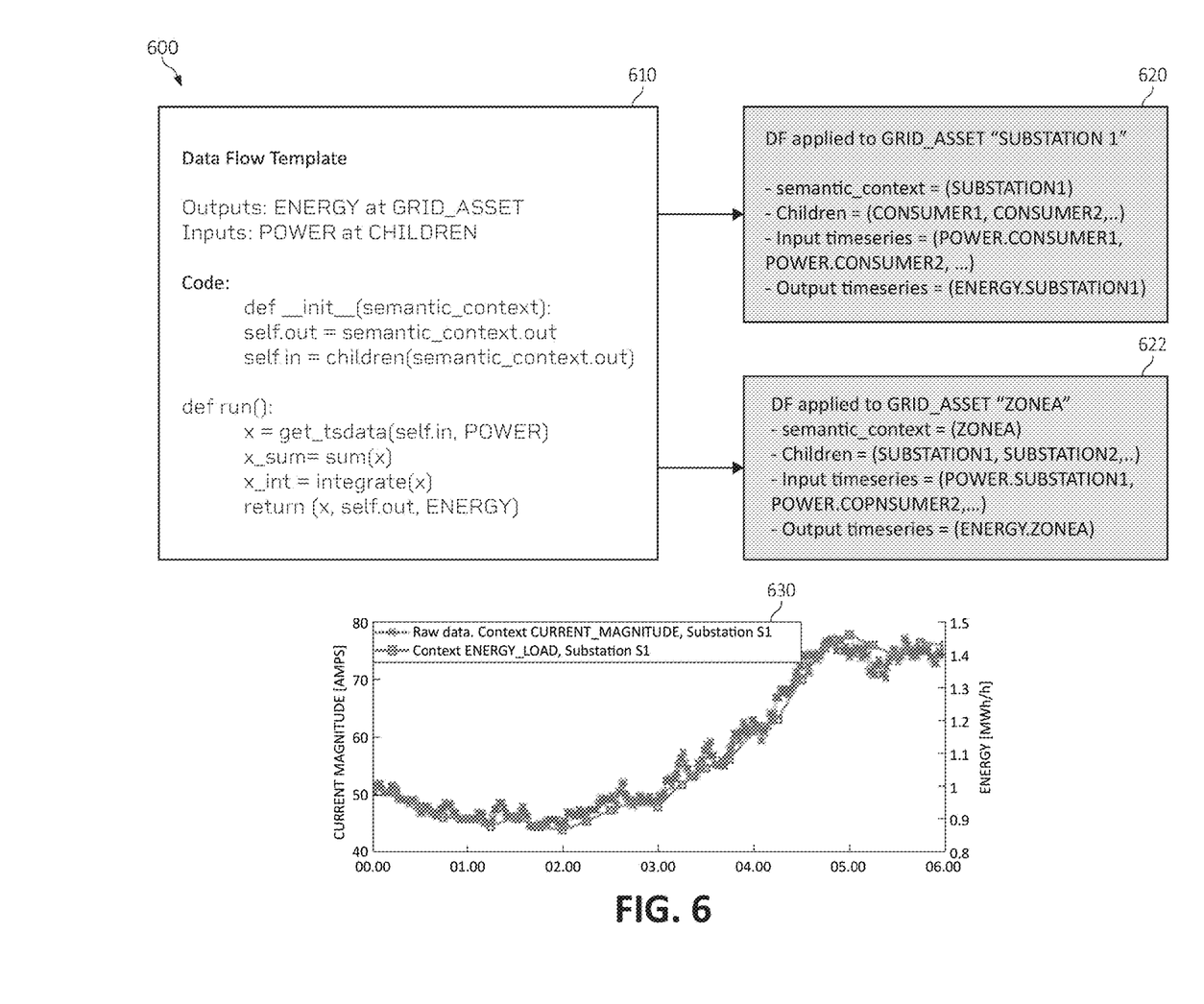
FIG. 6 is a diagram depicting use of a data flow template for automated management of data transformation flows based on semantics in which aspects of the present invention may be realized.

In view of FIGS. 1-5, consider now diagram 600 of FIG. 6 depicting use of a data flow template for automated management of data transformation flows based on semantics. In one aspect, one or more of the components, modules, services, applications, and/or functions described in FIGS. 1-5 may be used in FIG. 6. For example, computer system/server 12 of FIG. 1, incorporating processing unit 16, may be used to perform various computational, data processing and other functionality described in FIG. 6. Repetitive description of like elements, components, modules, services, applications, and/or functions employed in other embodiments described herein is omitted for sake of brevity.

In one aspect, the data flow template 610 (e.g., data transformation template) may be applications (e.g., software code) implementing data transformations as function of an application such as, for example, generic code "semantic_context." The generic code "semantic_context" may be used to create specific data transformations such as, for example, data transformations 620, 622 and applied to specific instances of the generic semantic concepts indicated in the output/inputs of the data flow template 610. In one aspect, data transformations 620 may be the data flow template applied to semantic context substation 1 that is a grid asset and data transformations 622 may be the data flow template applied to semantic context "zone A" that includes several grid assets such as, for example substation 1 and 2.

As depicted in the exemplary example of the data flow template 610, the semantic entry points (e.g., power at the children) are the definition of the outputs (e.g., energy at the grid assets "grid_assets"). That is, the inputs of the data flow template 610 are the power at children of a power grid such as, for example, consumer 1 and consumer 2 and the output is the energy at the assets of the power grid such as, for example, substation 1 and substation 2.

The data flow template 610 may then execute, for example, by taking data and defining the grid assets, finds/identifies all the children of the grid assets, find/identifies all the time series data representing power of the children at each grid asset and then sums the time series data and performs an integration and returns an output of the energy consumption for a selected zone (e.g., zone A). For example, output timeseries data of the energy consumption for zone A may be depicted in graph 630.

Figure 7:
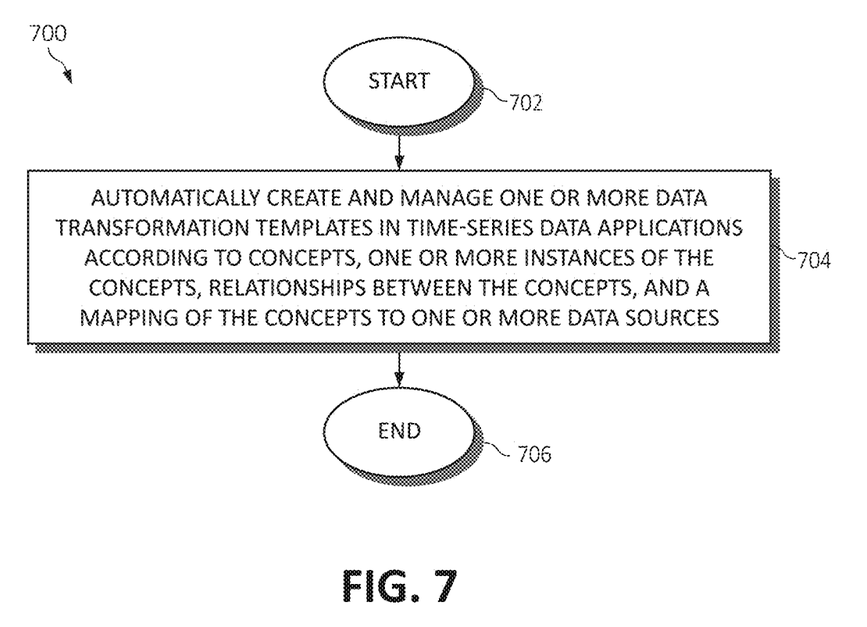
FIGS. 7-8 are flowchart diagrams depicting exemplary methods for providing automated management of data transformation flows based on semantics by a processor; again in which aspects of the present invention may be realized.

Turning now to FIG. 7, a method 700 for providing automated management of data transformation flows based on semantics using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

One or more data transformation in time-series data applications templates may be created and managed according to concepts, one or more instances of the concepts, relationships between the concepts, and a mapping of the concepts to one or more data sources, as in block 704. The functionality 700 may end, as in block 706.

Figure 8:
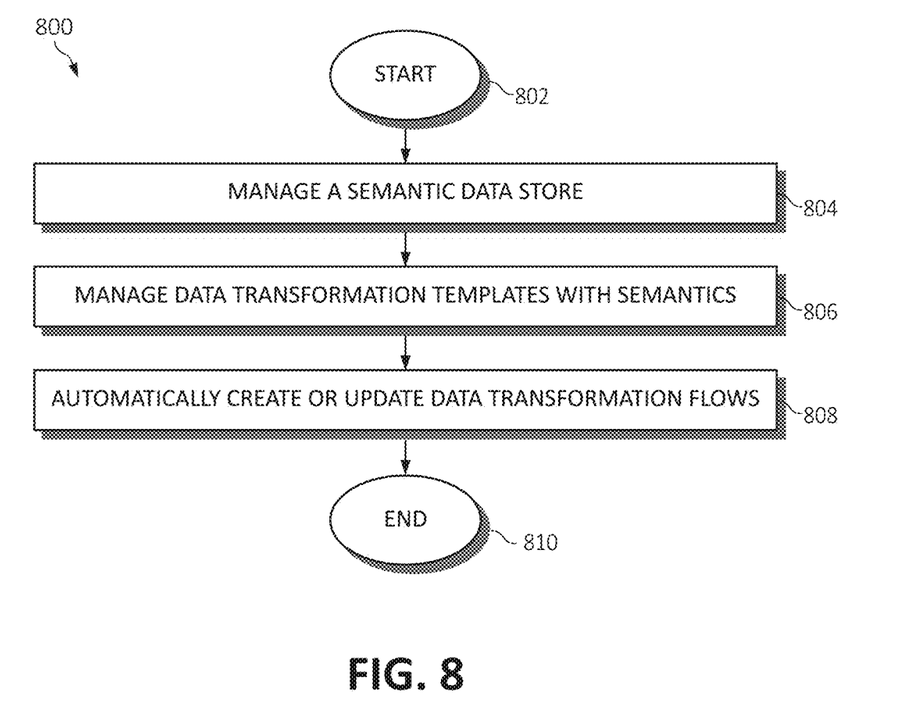

Turning now to FIG. 8, a method 800 for providing automated management of data transformation flows based on semantics using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

A semantic data store (e.g., a semantic ontology of a graph with nodes/concepts and relationships between the nodes/concepts), as in block 804. Data transformation templates with semantics (e.g., concepts and relationships between the concepts) may be managed, as in block 806. One or more data transformation flows may be automatically created or updated, as in block 808. The functionality 800 may end, as in block 810.

In one aspect, in conjunction with and/or as part of at least one blocks of FIGS. 7-8, the operations of 700 and/or 800 may include each of the following. The operations of 700 and/or 800 may represent a semantic description of time-series data applications using a semantic database according to the concepts, the one or more instances of the concepts, the relationships between the concepts, and the mapping of the concepts to one or more data sources.

The operations of 700 and/or 800 may receive the one or more data transformation templates and meta information specifying semantic concepts of inputs and outputs of the data transformation. The operations of 700 and/or 800 may create one or more instances of the one or more data transformation templates applied to a data sources that match the one or more instances of a semantic concepts describing input data to the one or more data transformation templates. The operations of 700 and/or 800 may create new data sources representing an output of the one or more data transformation templates and mapping the new data sources to the semantic concepts describing an output of the one or more data transformation templates.

The operations of 700 and/or 800 may also map time series data, one or more data sources, and semantic concepts, or a combination thereof to a semantic database. The operations of 700 and/or 800 may monitor and detect one or more changes in the one or more data sources and the concepts, and/or create additional data transformation templates upon determining the one or more data transformation templates are invalid.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for intelligent management of data flows in a computing environment by a processor comprising:
   automatically creating and managing one or more data transformation templates in time-series data applications according to concepts indicative of semantic descriptions of the time-series data applications represented in a graph of nodes, one or more instances of the concepts, relationships between the concepts, and a mapping of the concepts to one or more data sources, wherein the creating and managing of the one or more data transformation templates comprises initializing the one or more transformation templates by receiving transformation code specific to one or more of the concepts from a user;
   creating new data sources representing an output of the one or more data transformation templates and mapping the new data sources to the concepts describing the output of the one or more data transformation templates, wherein the creating of the new data sources representing the output comprises performing one or more data transformations by the one or more data transformation templates; and
   in response to the creating of the new data sources, using the newly created data sources by inferring additional data to generate additional data transformations.

2. The method of claim 1, further including representing the semantic description of the time-series data applications using a semantic database according to the concepts, the one or more instances of the concepts, the relationships between the concepts, and the mapping of the concepts to the one or more data sources.

3. The method of claim 1, further including receiving the one or more data transformation templates and meta information specifying concepts of inputs and outputs of the data transformation.

4. The method of claim 1, further including creating one or more instances of the one or more data transformation templates applied to the one or more data sources that match the one or more instances of a concept describing input data to the one or more data transformation templates.

5. The method of claim 1, further including mapping the time-series data, the one or more data sources, and the concepts, or a combination thereof to a semantic database.

6. The method of claim 1, further including:
monitoring and detecting one or more changes in the one or more data sources and the concepts; or
creating the additional data transformation templates upon determining the one or more data transformation templates are invalid.

7. A system for providing intelligent management of data flows in a computing environment, comprising:
one or more processors with executable instructions that when executed cause the system to:
automatically create and manage one or more data transformation templates in time-series data applications according to concepts indicative of semantic descriptions of the time-series data applications represented in a graph of nodes, one or more instances of the concepts, relationships between the concepts, and a mapping of the concepts to one or more data sources, wherein the creating and managing of the one or more data transformation templates comprises initializing the one or more transformation templates by receiving transformation code specific to one or more of the concepts from a user;
create new data sources representing an output of the one or more data transformation templates and mapping the new data sources to the concepts describing the output of the one or more data transformation templates, wherein the creating of the new data sources representing the output comprises performing one or more data transformations by the one or more data transformation templates; and
in response to the creating of the new data sources, use the newly created data sources by inferring additional data to generate additional data transformations.

8. The system of claim 7, wherein the executable instructions further represent the semantic description of the time-series data applications using a semantic database according to the concepts, the one or more instances of the concepts, the relationships between the concepts, and the mapping of the concepts to the one or more data sources.

9. The system of claim 7, wherein the executable instructions further receive the one or more data transformation templates and meta information specifying the concepts of inputs and outputs of the data transformation.

10. The system of claim 7, wherein the executable instructions further create one or more instances of the one or more data transformation templates applied to the one or more data sources that match the one or more instances of a concept describing input data to the one or more data transformation templates.

11. The system of claim 7, wherein the executable instructions further map the time-series data, the one or more data sources, and the concepts, or a combination thereof to a semantic database.

12. The system of claim 7, wherein the executable instructions further:
monitor and detect one or more changes in the one or more data sources and the concepts; or
create the additional data transformation templates upon determining the one or more data transformation templates are invalid.

13. A computer program product for, by one or more processors, providing intelligent management of data flows in a computing environment, the computer program product comprising a non-transitory computer-readable storage medium having computer-readable program code portions stored therein, the computer-readable program code portions comprising:
an executable portion that automatically creates and manages one or more data transformation templates in time-series data applications according to concepts indicative of semantic descriptions of the time-series data applications represented in a graph of nodes, one or more instances of the concepts, relationships between the concepts, and a mapping of the concepts to one or more data sources, wherein the creating and managing of the one or more data transformation templates comprises initializing the one or more transformation templates by receiving transformation code specific to one or more of the concepts from a user;
an executable portion that creates new data sources representing an output of the one or more data transformation templates and mapping the new data sources to the concepts describing the output of the one or more data transformation templates, wherein the creating of the new data sources representing the output comprises performing one or more data transformations by the one or more data transformation templates; and
an executable portion that, in response to the creating of the new data sources, uses the newly created data sources by inferring additional data to generate additional data transformations.

14. The computer program product of claim 13, further including an executable portion that represents the semantic description of the time-series data applications using a semantic database according to the concepts, the one or more instances of the concepts, the relationships between the concepts, and the mapping of the concepts to the one or more data sources.

15. The computer program product of claim 13, further including an executable portion that receives the one or more data transformation templates and meta information specifying the concepts of inputs and outputs of the data transformation.

16. The computer program product of claim 13, further including an executable portion that creates one or more instances of the one or more data transformation templates applied to the one or more data sources that match the one or more instances of a concept describing input data to the one or more data transformation templates.

17. The computer program product of claim 13, further including an executable portion that maps the time-series data, the one or more data sources, and the concepts, or a combination thereof to a semantic database.

18. The computer program product of claim 13, further including an executable portion that:
monitors and detects one or more changes in the one or more data sources and the concepts; or creates the additional data transformation templates upon determining the one or more data transformation templates are invalid.

\* \* \* \* \*